(12) United States Patent
Callard

(10) Patent No.: US 10,177,869 B2
(45) Date of Patent: Jan. 8, 2019

(54) SYSTEMS AND METHODS FOR REDUCING BANDWIDTH OVERHEAD

(71) Applicant: Aaron James Callard, Ottawa (CA)

(72) Inventor: Aaron James Callard, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 15/276,368

(22) Filed: Sep. 26, 2016

(65) Prior Publication Data

US 2018/0091248 A1 Mar. 29, 2018

(51) Int. Cl.
 *H04J 11/00* (2006.01)
 *H04W 28/06* (2009.01)
 *H04W 88/08* (2009.01)

(52) U.S. Cl.
 CPC ......... *H04J 11/0023* (2013.01); *H04J 11/004* (2013.01); *H04W 28/06* (2013.01); *H04W 88/085* (2013.01)

(58) Field of Classification Search
 CPC .... H04W 72/12; H04W 28/06; H04L 1/0003; H04L 1/0009; H04J 11/00
 USPC ................ 370/254–328, 336–347, 412–468
 See application file for complete search history.

(56) References Cited

U.S. PATENT DOCUMENTS

| | | | | |
|---|---|---|---|---|
| 6,483,832 B1* | 11/2002 | Civanlar | ............. | H04L 12/1886 370/390 |
| 7,382,755 B2* | 6/2008 | Dugad | ................. | H04W 72/10 370/337 |
| 7,539,475 B2* | 5/2009 | Laroia | ....................... | H04B 1/12 370/317 |
| 7,721,179 B2* | 5/2010 | Kim | ....................... | H04L 1/0041 714/755 |
| 8,311,102 B2* | 11/2012 | Lu et al. | .................. | H04N 7/12 375/240.1 |

(Continued)

FOREIGN PATENT DOCUMENTS

| | | | |
|---|---|---|---|
| CN | 101841935 A | | 9/2010 |
| CN | 101932002 A | | 12/2010 |

(Continued)

OTHER PUBLICATIONS

International Search Report dated Jun. 17, 2017 for corresponding International Application No. PCT/CN2017/084568 filed May 16, 2017.

(Continued)

*Primary Examiner* — Man U Phan

(57) ABSTRACT

There is provided a method of decoding an encoded uplink signal, in accordance with embodiments of the present invention. The method comprises a network node receiving an encoded uplink signal from a receive point, and decoding the encoded uplink signal using an estimated interference signal as side information input. The encoded uplink signal was encoded with a practically disconnected many-to-one encoding scheme. There is also provided a network node comprising a decoder. The decoder is configured to receive an encoded wireless uplink signal from a receive point, and decode the encoded wireless uplink signal using an estimated interference signal as side information. The encoded uplink signal was encoded with a practically disconnected many-to-one encoding scheme.

18 Claims, 10 Drawing Sheets

(56) References Cited

U.S. PATENT DOCUMENTS

| | | | |
|---|---|---|---|
| 8,340,193 B2* | 12/2012 | Lu et al. | H04N 7/12 375/240.19 |
| 8,593,932 B2* | 11/2013 | Laroia | H04L 5/023 370/203 |
| 9,300,440 B2* | 3/2016 | Braithwaite | H04W 84/047 |
| 2011/0267962 A1* | 11/2011 | J S A | H04L 41/147 370/242 |
| 2012/0184218 A1* | 7/2012 | Boudreau | H04B 7/024 455/63.1 |
| 2015/0365162 A1* | 12/2015 | Klein | H04B 7/2656 370/336 |
| 2016/0006578 A1* | 1/2016 | Zhong | H04L 49/351 370/254 |
| 2017/0222759 A1* | 8/2017 | Meng | H04L 1/0058 |

FOREIGN PATENT DOCUMENTS

| | | |
|---|---|---|
| EP | 2675098 A1 | 12/2013 |
| WO | 2016145371 | 9/2016 |
| WO | 2016039839 A1 | 3/2017 |

OTHER PUBLICATIONS

Sridhara, D. "The Wyner-Ziv Approach to Distributed Source Coding", Feb. 6, 2003.

Dupraz, E. et al. "Universal Wyner-Ziv Coding for Gaussian Sources", published at 2013 IEEE International Conference on Acoustics, Speech and Signal Processing, May 26-31, 2013.

Girod, B. "Towards Practical Distributed Coding", Information Systems Laboratory, Standford University, May 5, 1999.

Muller, R. et al. "Vector Precoding for Wireless MIMO Systems: A Replica Analysis", Jun. 8, 2007.

* cited by examiner

SYSTEMS AND METHODS FOR REDUCING BANDWIDTH OVERHEAD

FIELD OF THE INVENTION

The present invention pertains to the field of network communications, and in particular to systems and methods for reducing bandwidth of signal representation in communications networks.

BACKGROUND

In a centralized radio access network (C-RAN) environment with full duplex transmissions, or asynchronous time-division duplexing to emulate full-duplex communication over a half-duplex communication link, signals transmitted by user equipment (UE) and received by remote radio heads (RRHs) are sent to a network node ("uplink communications"), such as a network operations center, for centralized processing. The directional communication link from a remote radio head to the network node is typically a fiber optic cable that requires enough bandwidth to transmit the signals that are received wirelessly at that RRM to the central network node.

The RRHs typically have both transmit and receive capabilities, though in some cases separate RRHs may be used for each function. For transmit operations where signals are transmitted by the RRHs to UE ("downlink communications"), the RRHs receive the outgoing signal from a network node, and carry out localized processing as required to prepare the signal for broadcast. In many cases the outgoing signal is prepared at the same network operations center that processes the received signals.

Due to the nature of downlink communications, a variety of methods are used to reduce the bandwidth of the downlink communications between the network node that generates the transmit signal, and the RRHs that prepare and broadcast the signal. These methods take advantage of the controlled system between the network node and the RRH, as well as the controlled operations of the RRH in preparing and broadcasting the signal.

A difficulty with uplink communications is that until the received signal is processed, it includes interference and noise. Generally, it is preferred to perform the some or all of the signal processing at the network node. Accordingly, uplink communications are generally transmitted from the RRH to the network node with only limited bandwidth reduction.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved method and apparatus for reducing bandwidth overhead in an uplink transmission between a radio head and a network node of a communications network.

In accordance with embodiments of the present invention, a method of decoding an encoded uplink signal is provided. The method comprises a network node receiving an encoded uplink signal from a receive point, and decoding the encoded uplink signal using an estimated interference signal as side information input. The encoded uplink signal was encoded with a practically disconnected many-to-one encoding scheme.

In accordance with embodiments of the present invention, there is also provided a network node comprising a decoder. The decoder is configured to receive an encoded wireless uplink signal from a receive point, and decode the encoded wireless uplink signal using an estimated interference signal as side information. The encoded uplink signal was encoded with a practically disconnected many-to-one encoding scheme.

In accordance with embodiments of the present invention, there is also provided a method of managing a wireless uplink signal. The method comprises a network node transmitting to a receive point encoding instructions that specify parameters associated with an encoding operation to be performed at the receive point to encode the wireless uplink signal. The encoding instructions include at least one of a sampling rate to sample the wireless uplink signal, a number of bits to use in a bit reduction operation when encoding the wireless uplink signal, a specified encoding operation to use when encoding the wireless uplink signal, and at least one encoding parameters for use in the encoding operation.

In accordance with embodiments of the present invention, there is also provided a network node comprising a controller. The controller is configured to instruct a receive point how to encode a wireless uplink signal using a many-to-one encoding scheme, instruct at least one transmit point to transmit to transmit a wireless signal, and provide a network node decoder a representation of wireless signal instructions sent to the at least one transmit points. The at least one transmit point are within operational range of the receipt point.

In accordance with embodiments of the present invention, there is also provided a method of encoding a wireless uplink signal. The method comprises the receive point encoding a wireless uplink signal using a practically disconnected many-to-one encoding scheme, and sending the encoded uplink signal to a network node.

In accordance with embodiments of the present invention, there is also provided a receive point comprising and encoder and transmitting functionality. The encoder is configured to encode wireless uplink signals received at one or more antenna connected to the encoder. The transmitting functionality is configured to send encoded wireless uplink signals to a network node.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention are directed towards systems and methods for reducing bandwidth of signal representation in a communication network. This reduces backhaul overhead, i.e., reduces the bandwidth of signal representation of signals received by radio heads (RHs) and transmitted to a corresponding network node that processes the signals.

Figure 1:
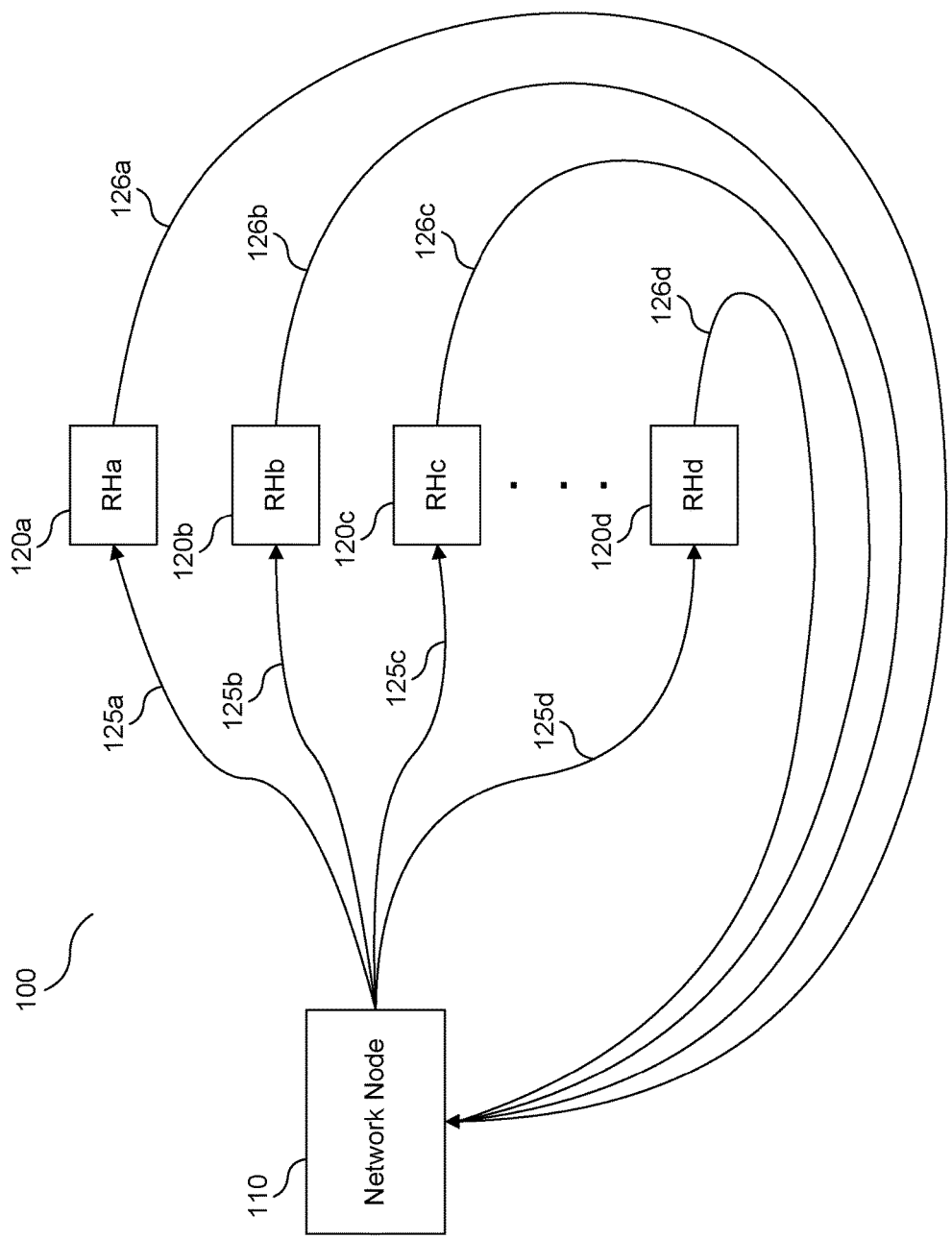
FIG. 1 is a network diagram of a network architecture, in accordance with an embodiment of the present invention.

FIG. 1 is a network diagram of a network architecture 100, in accordance with an embodiment of the present invention. The network architecture 100 comprises a network node 110 and a plurality of radio heads (RHs) 120a, 120b, 120c, . . . , 120d that are typically a distance away from the network node servers (not shown). Each RH may comprise wireless transmitting (transmit point) and wireless receiving (receive point) functionality (not shown) for wireless communication (for example, with user equipment) and wired transmitting and wired receiving functionality for communication with the network node 110. The communication with the network node 110 may alternatively be wireless. The network node 110 is communicatively connected with a core network (not shown). In some implementations RHs may only provide one of receive point or transmit point functionality. In some implementations, the network may include a combination of RHs that provide one of combined receive point/transmit point functionality, and one of receive point or transmit point functionality. Each RH may represent one or more antennas, and associated processing chains.

The network node 110 generates signals to be transmitted by the RHs. The network node 110 sends the generated signals to the RHs 120a, 120b, 120c, . . . , 120d via downlink communication links 125a, 125b, 125c, . . . , 125d. The RHs, acting as transmit points, then transmit their assigned signal over the air. When an RH acts as a receive point, it receives an uplink signal from over the air, and sends the received uplink signal to the network node 110 via its uplink communication links 126a, 126b, 126c, . . . , 126d. In a full-duplex environment, the receive point RHs may receive wireless signals and send them to the network node at the same time as the network node 110 is generating and sending signals to respective transmit point RHs. The downlink communication links 125a, 125b, 125c, . . . , 125d and uplink communication links 126a, 126b, 126c, . . . , 126d could be wireless, fiber optic, Ethernet, or another suitable data communication links.

Typically, two or more of the RHs are within radio range of each other. As such, when one RH acting as a receive point (receive point RH) is receiving a wireless signal, say from a user equipment (UE), the signal may include, among other noise, interference from the wireless transmissions of other RHs acting as transmit points (transmit point RHs) within the wireless communication range (i.e., operational range) of the receiving RH. The receive point RH that received the signal from the UE will send the signal to the network node 110 for processing to remove the interference caused by the other transmit point RHs.

The receive point RHs may each apply an encoding scheme to the wireless uplink signal it receives and transmit an encoded uplink signal to the network node 110. The encoding scheme reduces a bandwidth of the received uplink signal, and accordingly the encoded uplink signal is of smaller bandwidth than the received uplink signal. As such, the bandwidth of signal representation in the backhaul of the communication network is reduced.

Preferably, the network node 110 sends instructions to receive point RHs via the downlink communication links 125a, 125b, 125c, . . . , 125d about how the RHs 120a, 120b, 120c, . . . , 120d, respectively, should send information back to the network node 110. For example, the network node 110 would instruct the receive point RH regarding the encoding scheme to use on the received wireless signals, as well as the associated parameters for that encoding scheme. For instance, the receive point RH may be instructed on a number of bits (i.e., modulus) to use when modifying received wireless signals, and/or what quantization scheme to use on the received wireless signals. In practice some preprocessing of the information (fast Fourier transform (FFT), equalization, etc.) may be performed by the RH before transmission to the network node 110.

The encoding scheme may be a lossy encoding scheme for reducing a bandwidth of the received uplink signals. This lossy encoding may include the application of a non-linear operator, followed by quantization. Examples of non-linear operators include a single dimensional modulo operator, and a multidimensional modulo operator (such as a syndrome decoder, i.e., distributed source coding using syndromes (DISCUS) using forward error correction (FEC) codes)), and Wyner-Ziv encoding schemes. These non-linear operators map many different points into the same point. For instance 1 and 11 are both mapped to 1 modulo 10. We can thus call them many-to-one operators. We also term these "disconnected many-to-one" as the regions which are mapped to the same point are disconnected. By "disconnected" we mean that there are at least two points which map to some point x, for which there no line (curved or otherwise) which can connect those two points and have every point along that line mapped to the same point x. To give an example let us consider a standard linear quantizer that maps any number to the nearest integer. Points 1.1 and 0.9 are connected as they both get mapped to 1 and anything between those points is also mapped to 1. Let us now consider the operator which maps any point to the nearest integer of the point modulo 10. i.e., round(mod(x,10)). There is no line which connects 1.1 and 10.9, for which all values are mapped to 1. Thus, this is a disconnected many-to-one encoder.

Now it may be possible to create encoders for which you can create this line (in multiple dimensions for instance). The larger area associated with connecting these disparate areas, the worse the performance. However, by making the likelihood of a signal arrive on this area vanishingly small, the performance impact can be vanishingly small. We term the practically disconnected many-to-one encoder, to be any encoder for which there exists a disconnected many-to-one encoder which generates the same mapping for a very large percentage of the time. Such an encoder uses a practically disconnected many-to-one encoding scheme.

When applied to a received wireless uplink signal, the non-linear operators modify the received wireless uplink signal such that the encoded uplink signal has a lower dynamic range. This reduced dynamic range then leads to a lower bandwidth representation. The RHs 126a, 126b, 126c, . . . , 126d apply these encoding instructions to received wireless uplink signals and send the resulting encoded uplink signals to the network node 110 via uplink communication links 126a, 126b, 126c, . . . , 126d, respectively.

When the encoder uses the one-dimensional modulo operator, this can be equivalent to dropping some of the most significant bits. Due to the low complexity and intuitive application, this solution is of practical interest and is termed a bit reduction operator. It should be emphasized that this is dropping the most significant bits and is thus significantly different from other bit operations typically applied in this environment.

The received uplink signal may be quantized before transmission to the network node. The quantization scheme may include vector quantizers. A vector quantizer is a quantizer which represents several symbols simultaneously. These multiple signals may represent different receive antennas. If such vector quantizers are used, then the control information sent to the receive point RH includes information relating to the vector that is to be used. This vector may be preconfigured.

Figure 2:
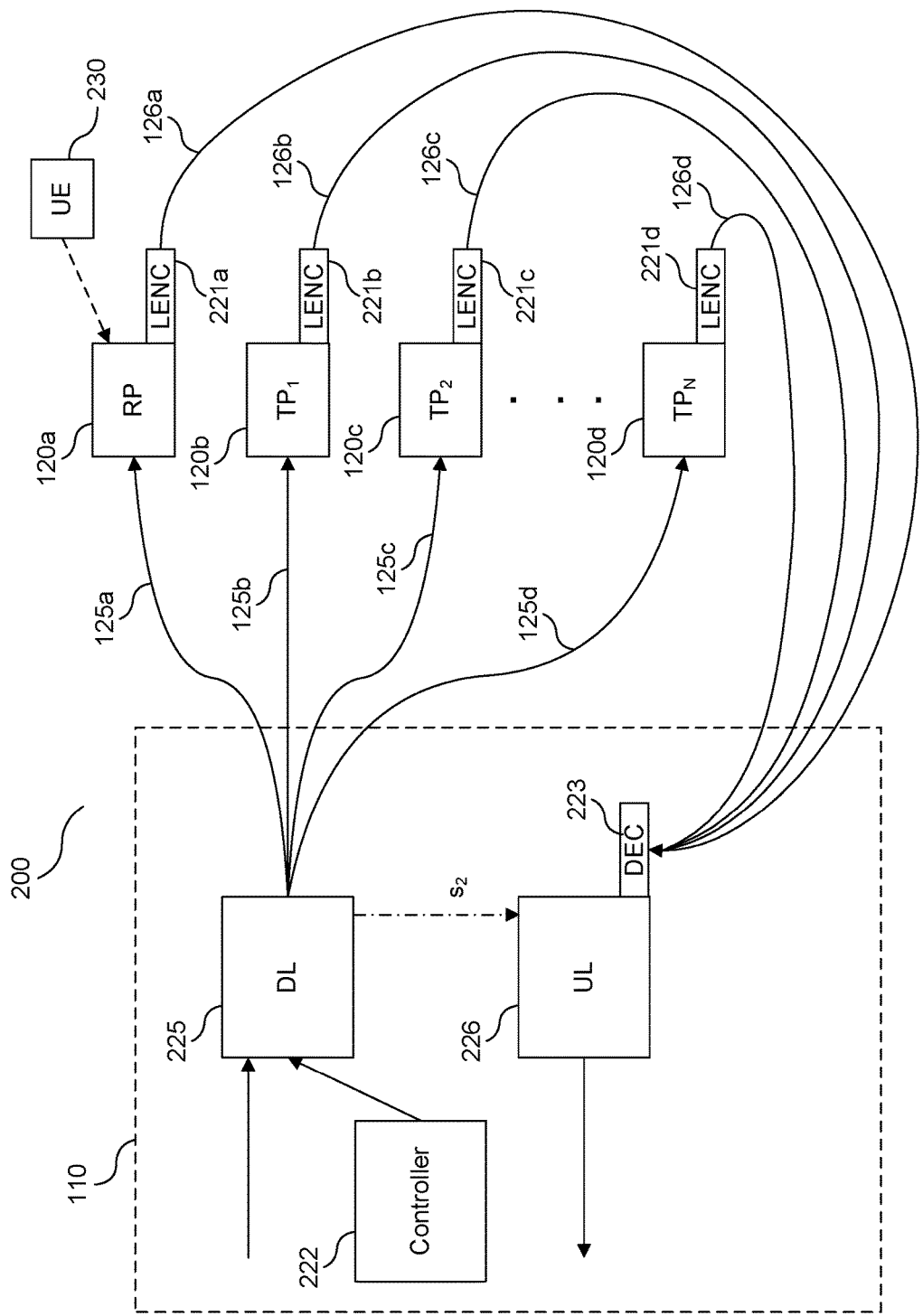
FIG. 2 is a network diagram of an implementation of the network architecture 200, in accordance with an embodiment of the network architecture of FIG. 1.

FIG. 2 is a network diagram of an implementation of a network architecture 200, in accordance with an embodiment of the network architecture of FIG. 1. The network architecture 200 comprises the network node 110, and the plurality of RHs 120a, 120b, 120c, . . . , 120d. The network node 110 is a logical collection of a controller 222, a decoder 223, a downlink (DL) unit 225 and an uplink (UL) unit 226. The decoder 223 may be a decoder that determines the information contained within a wireless uplink signal for processing at the UL unit 226. The DL unit 225 receives downlink communications from the core network (not shown) to be sent over-the-air to the receiving UE. The DL unit 225 generates a wireless signal and sends the wireless signal via a downlink communication link 125a, 125b, 125c, . . . 125d to the respective RH 120a, 120b, 120c, . . . , 120d for transmission over-the-air. RHs that have been instructed by the DL unit 225 to send a transmission may be defined as transmit points (TPs).

RHs may be considered as receive points (RPs) when receiving wireless signals over the air (for example, from user equipment such as UE 230) and transmit points (TPs) when transmitting signals assigned to the respective RHs by the DL unit 225. In this example, RH 120a is labelled as a receive point (RP 220a), and RHs 120b, 120c, . . . 120d are labelled as transmit points (TPs 220b, 220c, . . . , 220d). The RHs also have associated encoders 221a, 221b, 221c, . . . , 221d, respectively. The encoders may be lossy encoders. The encoders may be part of the RHs. The encoders may be separate from, but preferably communicatively close to, the RHs. It should be noted that only when acting as an RP would data be sent from the RH to the decoder 223. In some instances, a RP can also be a TP (i.e., a RTP).

When a RP receives an uplink wireless signal, the RP sends the received uplink signal to the associated lossy encoder. That lossy encoder encodes the received information by the RP into information which is efficient to send over the link (126a). Preferably, this may be done through two steps. Firstly, the encoder maps the received signals into another signal with a lower dynamic range than the received uplink signal. Next, quantization (perhaps multidimensional) is performed on this lower dynamic range signal. It is possible to only perform the first step (for example in a purely analogue system), but most implementations would also use quantization to digitize the data to be sent to the decoder 223. In instances where the collection of symbols is modified jointly (i.e., syndrome), it is likely the average dynamic range (rather than the absolute dynamic range) is reduced, which then results in a lower bandwidth signal for certain forms of quantization (i.e., Gaussian). This lower dynamic range encoded uplink signal uses up less bandwidth on UL communication links 126a, 126b, 126c, . . . , 126d for the same amount of quantization noise added. The encoded uplink signal is then sent via UL communication links 126a via UL communication links 126a to a decoder 223.

The decoder 223 uses knowledge of transmission signals that the TPs 120b, 120c, . . . , 120d sent at the time that the RP 120a received the uplink signal, as well as information from DL node 225, and decodes the encoded uplink signal (i.e., constructs what the received signal at RP 120a would have been if TPs 120b, 120c, . . . , 120d were not transmitting at the same time). The transmission signals of the TPs 120b, 120c, . . . , 120d that are within communication range of the RP 120a may be used to estimate a combined TP interference signal that represents the combination of the transmission signals as received by the RP 120a. This combined TP interference signal may be used by the decoder 223. The different TP signals may be combined outside or within the decoder 223. The decoder 223 passes the intended signal to the UL unit 226 for transmission to the core network (not shown). The decoder 223 may be part of the UL unit 226. Alternatively, the decoder 223 may be separate from, but logically associated with, the UL unit 226.

The network node 110 also includes a controller 222. The controller 222 provides to the RP 120a at least one of a sampling rate to sample the wireless uplink signal, a number of bits to use in a bit reduction operation when encoding the wireless uplink signal, a specified encoding operation to use when encoding the wireless uplink signal, vector quantization parameters if multiple antennas are present, and one or more encoding parameters for use in the encoding operation. The controller 222 may also indicate a specified quantization scheme to use when encoding the wireless uplink signal. The controller 222 may also ensure that the decoder 223 has access to copies of the downlink transmission signals sent to the TPs for wireless transmission. The controller 222 may instruct the DL unit 225 to send a copy (or representation) of the downlink transmission signals to the decoder 223. Alternatively, the DL unit 225 sends the downlink transmission signals (or representations thereof) to the UL unit 226 for storage (i.e., cached) and to be accessed by the decoder 223. The wireless uplink signal may also be quantized for digital transmission and encoded prior to being sent to the decoder 223. The representation of a signal may be a copy of the signal itself or any combination of information and/or data that can be used to replicate the signal.

Figure 3:
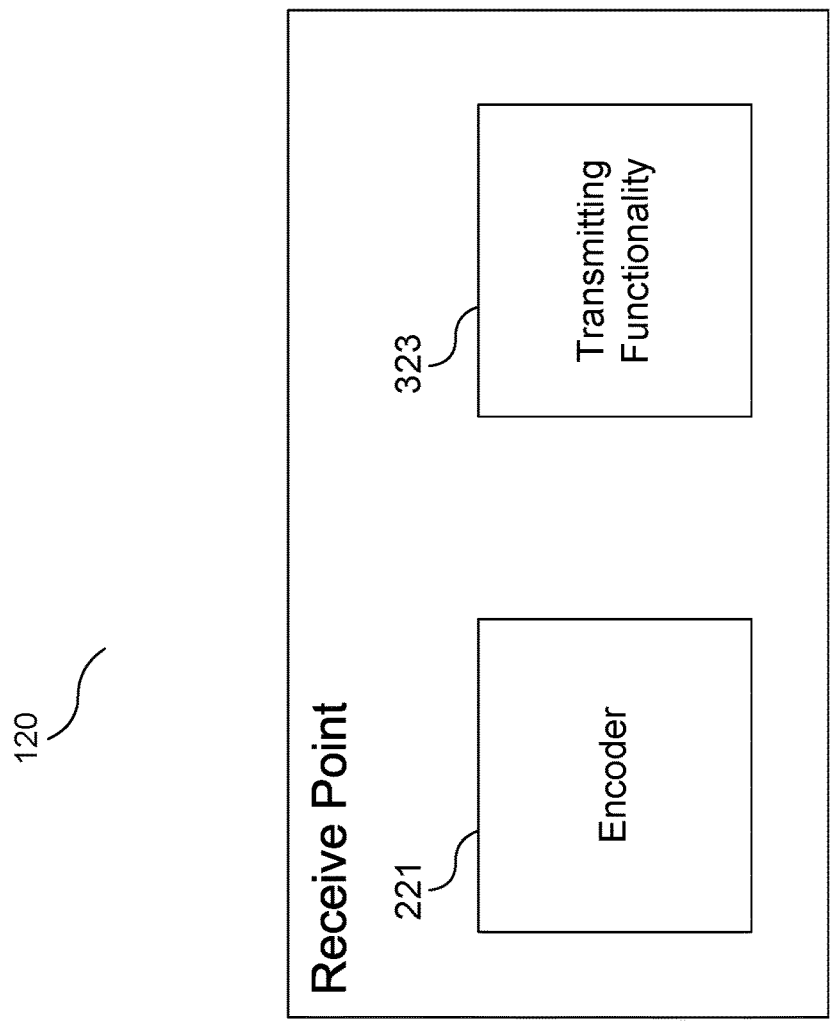
FIG. 3 is a component diagram of a receive point, in accordance with an embodiment of the present invention.

FIG. 3 is a component diagram of a receive point 120, in accordance with an embodiment of the present invention. The receive point 120 comprises an encoder 221 configured to encode wireless uplink signals using a many-to-one encoding scheme, and transmitting functionality 323 configured to send encoded uplink signals to a network node 110. The encoder 221 may be a lossy encoder (LENC) 221. The receive point may further include at least one antenna (not shown) configured to receive wireless uplink signals from user equipment, at least one antenna (not shown) configured to transmit wireless signals to user equipment, and receiving functionality (not shown) configured to receive communications form the network node. An antenna may be configured to receive and transmit at different times, and thus, an antenna may receive signals from, and transmit signals to, user equipment.

Figure 4:
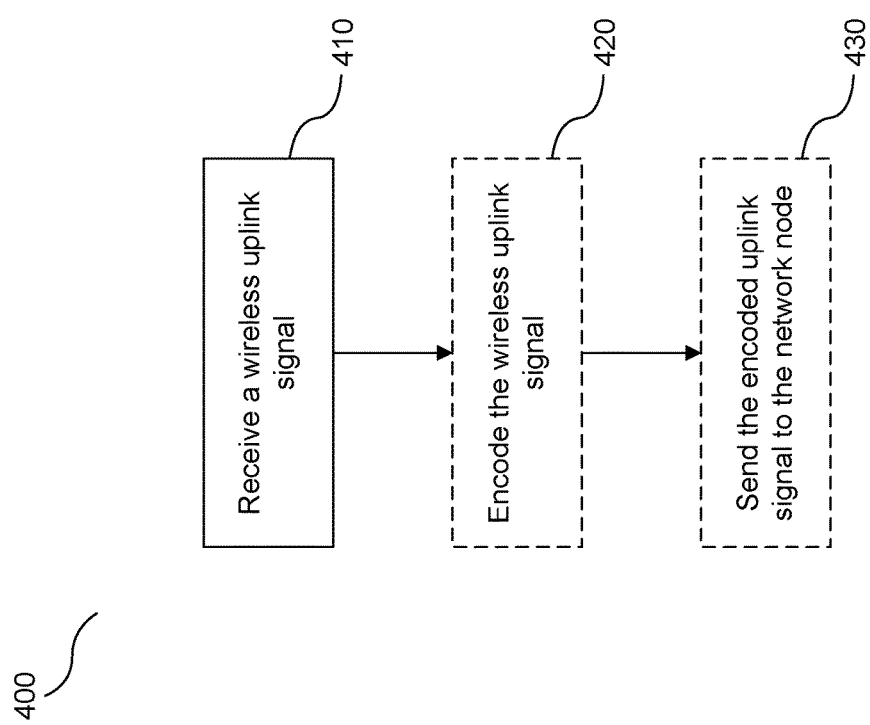
FIG. 4 is a flowchart of a method of encoding a wireless signal, in accordance with an embodiment of the receive point.

FIG. 4 is a flowchart of a method of encoding a wireless signal (400), in accordance with an embodiment of the receive point 120a. For the purposes of this discussion, RH 120a that receives the wireless signal will be referred to as the receive point 120a. The other RHs 120b, 120c, . . . , 120d that are in transmission range of the receive point will be referred to as the transmit points 120b, 120c, . . . , 120d. The method (400) comprises an encoder 221a at the receive point 120a encoding a received wireless uplink signal (420) into an encoded uplink signal using a practically disconnected many-to-one encoding scheme. The encoded uplink signal is then sent to the network node 110 (430). The method (400) optionally includes the receive point 120a receiving the wireless uplink signal (410). The wireless uplink signal would typically have been transmitted by a UE.

The encoded uplink signal has a lower bandwidth than the received wireless uplink signal. When the encoded uplink signal is passed to the network node 110 (430), the network node 110 will have information pertaining to the transmission signals sent by the at least one transmit point 120b, 120c, . . . , 120d. This feature will be described further below.

Since the receive point 120a is within operational range of the at least one transmit point 120b, 120c, . . . , 120d, it is possible for the wireless uplink signal sent by a UE to include interference from the at least one transmit point 120b, 120c, . . . , 120d. As such, the encoding (420) may be considered to be dependent upon the interference signals from the at least one transmit point 120b, 120c, . . . , 120d. Since the network node 110 instructed the transmit points 120b, 120c, . . . , 120d, the network node 100 has knowledge of the interference signals.

The encoding of the wireless uplink signal may include quantizing the received wireless signal for digital transmission (not shown). The encoding of the wireless uplink signal may include passing the received signal through a modulo operation prior to sending the encoded uplink signal to the network node 110. This lowers the dynamic range of the signal and less bandwidth is required on the UL communication link (i.e., the number of bits required to achieve a fixed quantization noise is reduced). Examples of modulo operations include removing some of the most significant bits of the wireless uplink signal. The encoding of the wireless uplink signal may include passing the received signal through a function of a lossy encoder 221 prior to sending the encoded uplink signal to the network node 110 in order to lower the bandwidth required on the uplink communication channel 126. Examples of lossy encoders 221 include a single dimensional modulo operator, and a multidimensional modulo operator (such as a syndrome decoder, i.e., distributed source coding using syndromes (DISCUS) using forward error correction (FEC) codes). The quantization may be performed before the modulo operation or lossy encoder function. Alternatively, the quantization may be performed after the modulo operation or lossy encoder function. Once the received wireless signal is encoded (420), the receive point transmits the encoded signal to the network node 110 (430) via the communication link 126 for processing at the network node 110. The most significant bits (MSBs) may be encoded in different transport network layer (TNL) packets which are given lower priority than other packets. Thus, the dropping of the MSBs can be done dynamically due to network load by the intermediary routers. In this environment, the controller would likely indicate the threshold between desired and potentially unneeded bits.

The encoding (420) may include passing the wireless uplink signal through a lossy encoder 221. The encoding (420) may include passing the wireless uplink signal through a Wyner-Ziv compression operation. The encoding (420) may include performing a modulo operation on the wireless uplink signal to produce the encoded uplink signal. The modulo operation and the Wyner-Ziv non-linear optimization will be further discussed below.

The method (400) may further include the receive point (i.e., RH 120a) receiving encoding instructions from the network node 110 regarding how to transmit the received wireless signal to the network node 110. Such encoding instructions may include a sampling rate to sample the wireless uplink signal. Such encoding instructions may include a number of bits to use in a bit reduction operation when encoding the wireless uplink signal. I.e., such encoding instructions may include the number of bits to use per sample for the encoding (i.e., the modulus of the encoding scheme). Such encoding instructions may include a specified encoding (i.e., modifying) operation to use when encoding the wireless uplink signal. Examples of modifying operations include non-linear operations (such as single dimensional modulo operations (e.g., dropping the most significant bits, etc.), multidimensional modulo operations (e.g., a syndrome decoder such as DISCUS using FEC codes), and Wyner-Ziv encoding schemes). Dropping the most significant bits is a one dimensional modulo operation. Higher dimension operations (such as DISCUS or other syndrome) lead to better performance. Such encoding instructions may include what quantization scheme to use. Example of quantization schemes include linear, Gaussian, etc. Such encoding instructions may include at least one encoding parameter for use in the encoding operation.

The method (400) may further include the receive point receiving instructions from the network node 110 to send a specified test signal at a specified time for channel estimation purposes.

Figure 5:
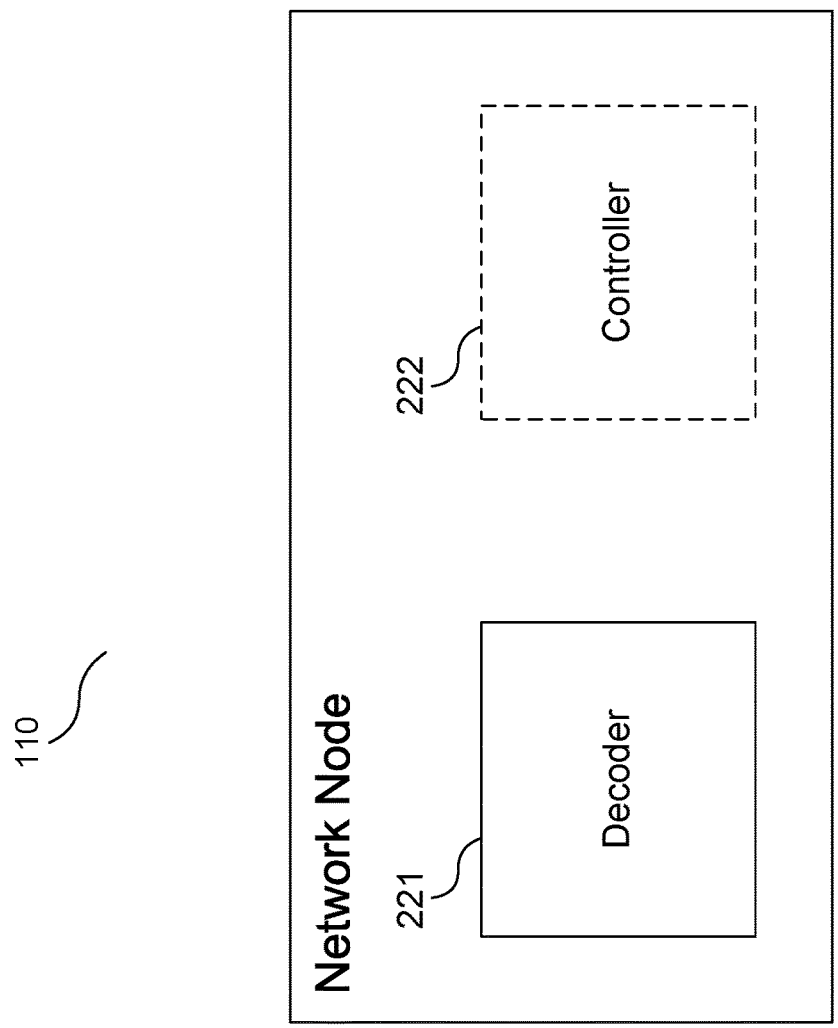
FIG. 5 is a component diagram of a network node, in accordance with an embodiment of the present invention.

FIG. 5 is a component diagram of a network node 110, in accordance with an embodiment of the present invention. The network node 110 comprises a decoder 223 configured to receive an encoded uplink signal from a receive point 120a, and decode the encoded uplink signal using an estimated interference signal as side information. The encoded uplink signal was encoded with a practically disconnected many-to-one encoding scheme. The decoder 223 may be decoder (DEC) 223 that determines the information contained within a wireless uplink signal for processing at an UL unit 226 (not shown). The decoder 223 may be further configured to subtract the estimated interference signal from the encoded signal to form a resulting signal, and to pass that resulting signal through a non-linear operator to produce a decoded uplink signal. The estimated interference signal may be based on a combination of wireless transmission signals transmitted from at least one transmit point 120b, 120c, . . . , 120d within operational range of the receive point 120a. The decoder 223 may further be configured to receive a representation of a transmission signal sent by the at least one transmit point 120b, 120c, . . . , 120d at the time that the wireless uplink signal was received by the receive point 120a.

The network node 110 may further comprise a controller 222 configured to perform scheduling and other operations at the network node 110. The decoder 223 and the controller 222 may be implemented together in the same logical network node, or separately in separate network nodes that may be configured to communicate with each other. In this example, the controller 222 is shown as optional.

The controller 222 may be configured to receive a representation of transmission signals sent by the at least one transmit point at the time that the wireless uplink signal was received by the receive point 120. The controller 222 may be configured to send to the at least one transmit point 120*b*, 120*c*, . . . , 120*d* transmission signals for that transmit point to wirelessly transmit. The controller 222 may be configured to receive a representation of the estimated interference signal for use in decoding the encoded wireless uplink signal.

The controller 222 may be configured to perform a channel estimation for each of the at least one transmit point 120*b*, 120*c*, . . . , 120*d* to determine a corresponding channel estimate between that transmit point and the receive point 120*a*. Channel estimation is further described below.

The controller 222 may be configured to transmit to the receive point 120*a* encoding instructions that specify parameters associated with an encoding operation to be performed at the receive point 120*a* to encode the wireless uplink signal. The encoding instructions are further described infra and below.

Figure 6:
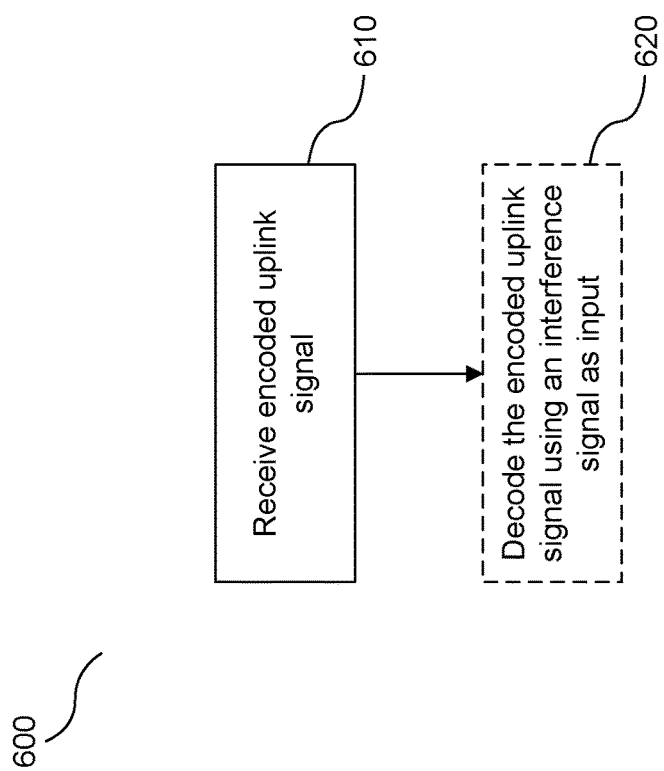
FIG. 6 is a flowchart of a method of decoding an encoded wireless signal, in accordance with an embodiment of the network node.

FIG. 6 is a flowchart of a method of decoding an encoded wireless uplink signal (600), in accordance with an embodiment of the network node 110. The network environment may include a network node 110, a receive point and at least one transmit point within operational range of the receive point. The receive point may be any RH (for example, RH 120*a*) that is receiving a wireless signal, and the at least one transmit point may be the other RHs (for example, 120*b*, 120*c*, . . . , 120*d*) that are within transmission range of the receive point and are wirelessly transmitting at the same time as the receive point is receiving a wireless communication. The method (600) is performed by the network node 110. The network node 110 receives an encoded uplink signal (610) from the receive point 120*a*, and decodes the encoded uplink signal (620) using an estimated interference signal as side information. The encoded uplink signal was encoded with a practically disconnected many-to-one encoding scheme. The decoding (620) produces a decoded uplink signal representing one or more uplink communications.

As is described above, prior to sending a received wireless uplink signal to the network node 110, the receive point 120*a* may use a non-linear operation or a lossy encoder 221 to encode the wireless uplink signal. The encoded uplink signal is based on, and has a lower bandwidth than, the wireless uplink signal. The wireless uplink signal included one or more uplink communications transmitted by UE to the receive point 120*a* and one or more interference signals received from a corresponding one or more transmit points 120*b*, 120*c*, . . . , 120*d* within operational range of said receive point 120*a*.

The estimated interference signal is based on a combination of wireless transmission signals transmitted from the one or more transmit point 120*b*, 120*c*, . . . , 120*d* at the same time as the receive point 120*a* received the wireless uplink transmission. Since the receive point 120*a* is within transmission range of the at least one transmit point 120*b*, 120*c*, . . . , 120*d*, the signals transmitted by the at least one transmit point 120*b*, 120*c*, . . . , 120*d* would interfere with an uplink signal that was wirelessly transmitted to the receive point 120*a*. The wireless transmission signals are signals that may be provided to the at least one transmit point 120*b*, 120*c*, . . . , 120*d* by the network node 110 for the transmit point to wirelessly transmit. Alternatively, the network node 110 may receive a representation of the transmission signals sent by the at least one transmit point 120*b*, 120*c*, . . . , 120*d* at the time that the wireless uplink signal was received by the receive point 120*a*. The network node 110 may also receive the estimated interference signal for use in decoding the encoded wireless uplink signal. The network node 110 may also perform a channel estimation for each of the at least one transmit point 120*b*, 120*c*, . . . , 120*d* to determine a corresponding channel estimate between that transmit point and the receive point 120*a*. A controller 222 in the network node 110 may determine said estimated interference signal by, for each transmit point 120*b*, 120*c*, . . . , 120*d*, applying the corresponding channel estimate to a representation of the transmission signal sent by that transmit point. This application results in an estimate of a transmit point interference signal received by the receive point 120*a* from that transmit point. The controller 222 in the network node then combines the transmit point interference signals to produce the estimated interference signal.

Figure 7:
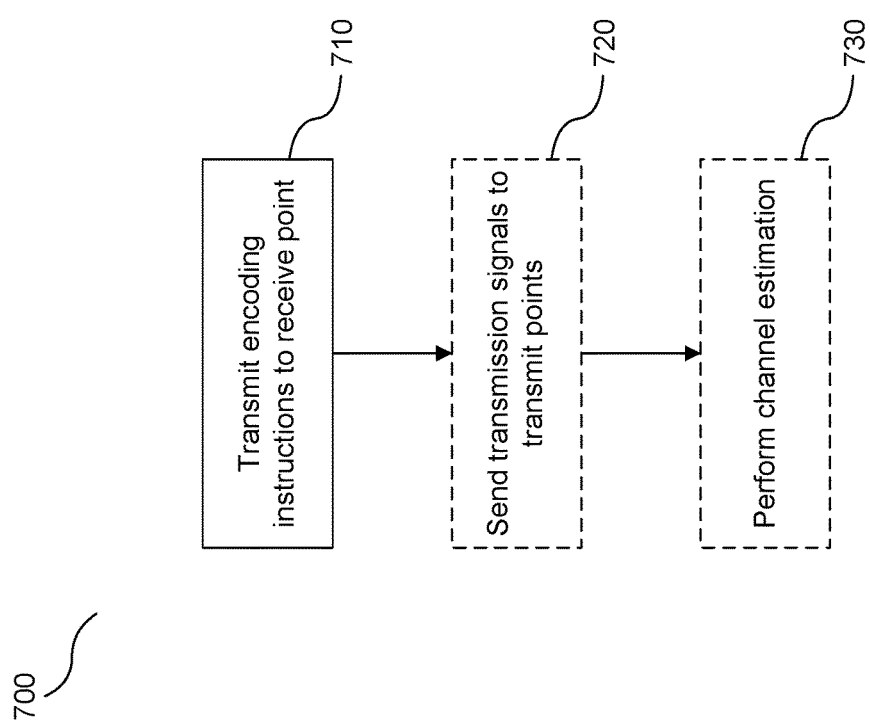
FIG. 7 is a flowchart of a method of managing a wireless uplink signal, in accordance with an embodiment of the network node.

FIG. 7 is a flowchart of a method of managing a wireless uplink signal (700), in accordance with an embodiment of the network node 110. The method (700) comprises the network node 110 transmitting to a receive point 120*a* encoding instructions (710) specifying parameters with an encoding operation to perform at the receive point 120*a* to encode the wireless uplink signal. The encoding instructions may include at least one of a sampling rate to sample the wireless uplink signal, a number of bits to use in a bit reduction operation when encoding the wireless uplink signal, a specified encoding operation to use when encoding the wireless uplink signal, and at least one encoding parameters for use in the encoding operation. The method (700) may also include sending to at least one transmit point 120*b*, 120*c*, . . . , 120*d* within operational range of the receive point 120*a* a transmission signal for that transmit point to wirelessly transmit (720). The method (700) may also include performing a channel estimation (730) for each of the at least one transmit point to determine a corresponding channel estimate between that transmit point and the receive point. Channel estimation is further described below.

As noted above, prior to receiving a wireless uplink signal, the network node 110 may send to the receive point 120*a* encoding instructions regarding how to transmit the wireless signal received at the receive point 120*a* to the network node 110. These instructions specify, among other items, what scheme to use to encode the received wireless signal.

If a non-linear operation was used to encode the wireless uplink signal received by the receive point, then a corresponding non-linear operation would be used to decode the encoded uplink signal at the network node. If the non-linear operation used to encode the wireless uplink signal at the receive point is a modulo operation, then the same modulo operation would be used to decode the encoded uplink signal at the network node when the modulo of the modulo operator is less than the dynamic range of the wireless signal received by the receive point. Said decoding may include subtracting the estimated one or more interference signals from the encoded signal (i.e., signal subtraction) to form a resulting signal, and passing the resulting signal through the non-linear operator (i.e., the same module used by the decoder) to produce the decoded uplink signal. The decoding may include reversing any quantization that has occurred at the receive point 120*a*. Essentially the side information is used to estimate which of the many-to-one choices where used when the encoding scheme took place.

The non-linear operation used may be the removal of some of the most significant bits. Such a removal is equivalent to applying a modulo operation. For example, consider a scenario where RH 120a (i.e., the receive point) receives a wireless uplink signal at the same time that RHs 120b and 120c (i.e., the transmit points) are transmitting wireless transmission signals as instructed to them by the network node 110. The desired signal is denoted as $s_1$. The interference signal is denoted as $s_2$ and comprises a combination of the wireless transmission signals simultaneously transmitted by RH 120b and RH 120c. The wireless uplink signal is denoted as y, where y=s1+s2. In the digital domain, by dropping the most significant bits, a modulo operator of y is effectively taken:

$$y \bmod = y\%\Delta = s1+s2+z\Delta$$

where:

$$z = \text{floor}(y/\Delta + \Delta/2)$$

In this example, $y_{mod}$ is the encoded uplink signal that is encoded by the receive point and transmitted to the network node 110. The network node 110 can estimate the interference signal $s_2$ by combining the wireless transmission signals that the network node 110 instructed the transmit points to transmit. The network node 110 may log such wireless transmission signal instructions in a repository (such as in a transmission log or a communication log in a database). The decoding functionality at the network node 110 can then remove (e.g., signal subtract) $s_2$ and pass the resulting data through the modulo function again:

$$y\bmod - s2)\% \Delta = (s1 + s2 + z\Delta - s2)\%$$
$$= (s1 + z\Delta)\% \Delta$$

When $s_1$ is less than $\Delta$, then $(s1+z\Delta)\%\Delta=s1$. Thus, the decoding functionality has reconstructed $s_1$.

The desired signal $s_1$ may contain other noise that the network node 110 could deal with using known techniques. Furthermore, the calculation of the estimated interference signal $s_2$ may include a channel estimation to determine what the receive point would receive from the wireless transmission signals sent by the transmit points. In one implementation, the channel estimation estimates a transfer function that maps the actual transmission signal that a transmit point was instructed to wirelessly transmit, to the actual received signal that a receive point received from that transmit point's transmission. Channel estimation is further discussed below.

Figure 8:
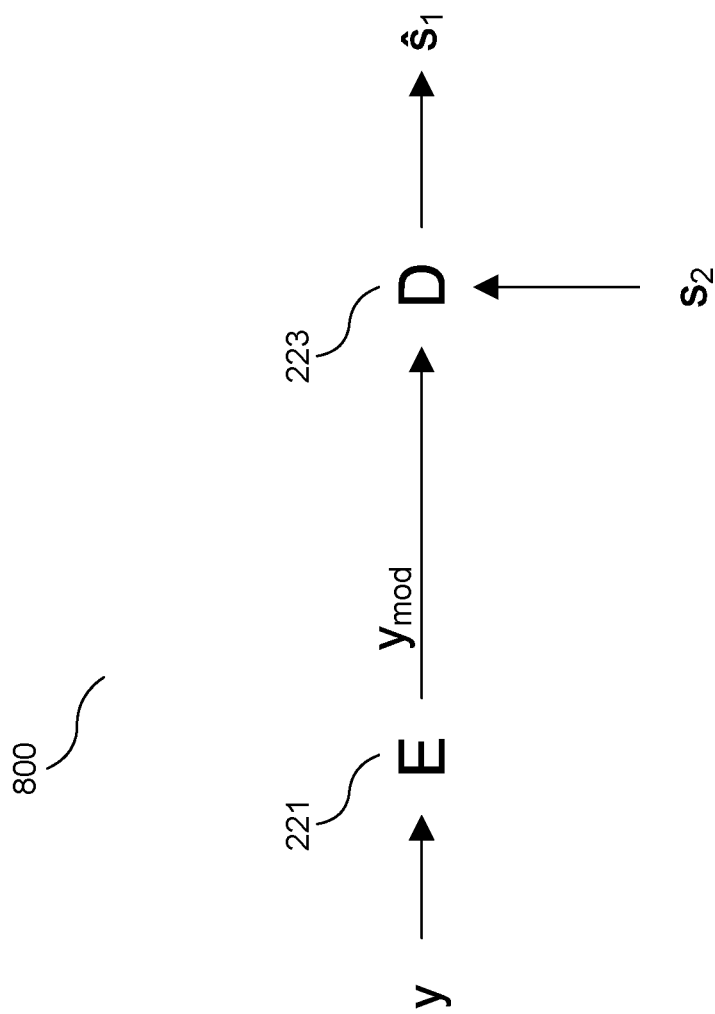
FIG. 8 shows an example of a non-linear operator coding scheme.

FIG. 8 shows an example of a non-linear operation coding scheme 800. The scheme 800 comprises a received signal y sent through a lossy encoder E 221 using a modulo function generating encoded signal $y_{mod}$ at the receive point. This encoded signal $y_{mod}$ is sent to the network node to be decoded at a decoder D 223. The interference signal $s_2$ and the encoded signal $y_{mod}$ are used as an input into D 223. The decoder D 223 removed $s_2$ from $y_{mod}$ and passes the resulting output through the same modulo function resulting in $s_1$.

In the above examples we presumed a linear quantizer in which the difference between any two quantized values was a fixed. size of $\Delta$. In other quantizers, this difference can fluctuate (i.e., for Gaussian quantizers). The choice of quantizer depends on what the expected probability density is after the application of the non-linear operation. In many cases, the probability density becomes near to uniform and the linear quantizer above is appropriate.

Figure 9:
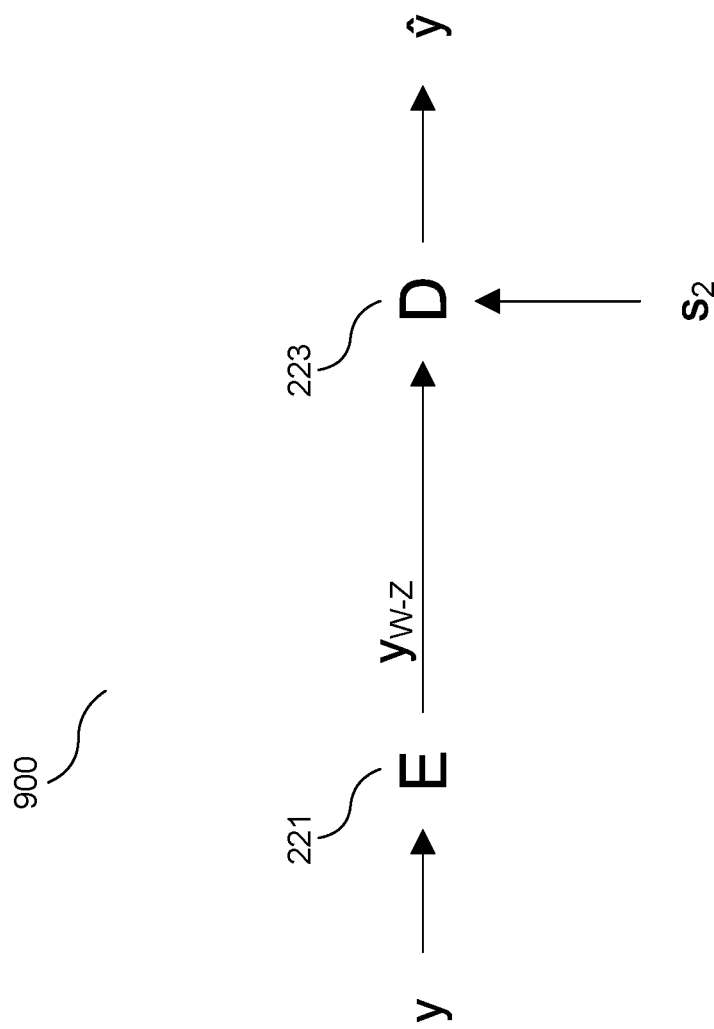
FIG. 9 shows an example of a Wyner-Ziv coding scheme.

Other schemes most generally described as Wyner-Ziv can be used to encode and decode the received signals. FIG. 9 shows an example of a Wyner-Ziv coding scheme 900. The scheme 900 comprises a receive signal y sent through a lossy encoder E 221 using a Wyner-Ziv encoding functionality generating encoded signal $y_{W-Z}$ at the receive point. This encoded signal $y_{W-Z}$ is sent to the network node to be decoded at the decoder D 223. The estimated interference signal $s_2$ and the encoded signal $y_{W-Z}$ are used as input into D 223. The decoder D 223 uses a corresponding Wyner-Ziv decoding functionality to decode the encoded signal $y_{W-Z}$ by reconstructing an estimation of the received signal $\hat{s}_1$ or $\hat{y}$. The decoder D 223 decodes the encoded signal using the interference signal as side information input to determine the Wyner-Ziv codeword. This codeword is then used to construct an estimation of the received signal $\hat{s}_1$ or $\hat{y}$. Removing the interference signal $s_2$ from the estimated received signal $\hat{y}$ produces the intended uplink signal.

Prior to using a coding scheme 800, 900, the network node 110 may perform a channel estimation to help determine what a transmission signal at a transmit point 120b, 120c, . . . , 120d would look like at a receive point 120a. The channel estimation is performed on some channels between the RHs 120a, 120b, 120c, . . . , 120d and the network node 110 to determine a corresponding channel estimate between that transmit point and the receive point. The channel estimation may include determining an estimated interference signal by, for each transmit point, applying the corresponding channel estimate to a transmission signal sent by that transmit point to obtain a transmit point interference signal received by the receive point from the transmit point. The transmit point interference signals are then combined to produce the estimated interference signal. Channel estimation is typically done periodically by the network node 110 by sending and receiving channel estimation signals and not modifying the received channel estimation signals using a non-linear operator in order to compare what was sent with what was received.

Figure 10:
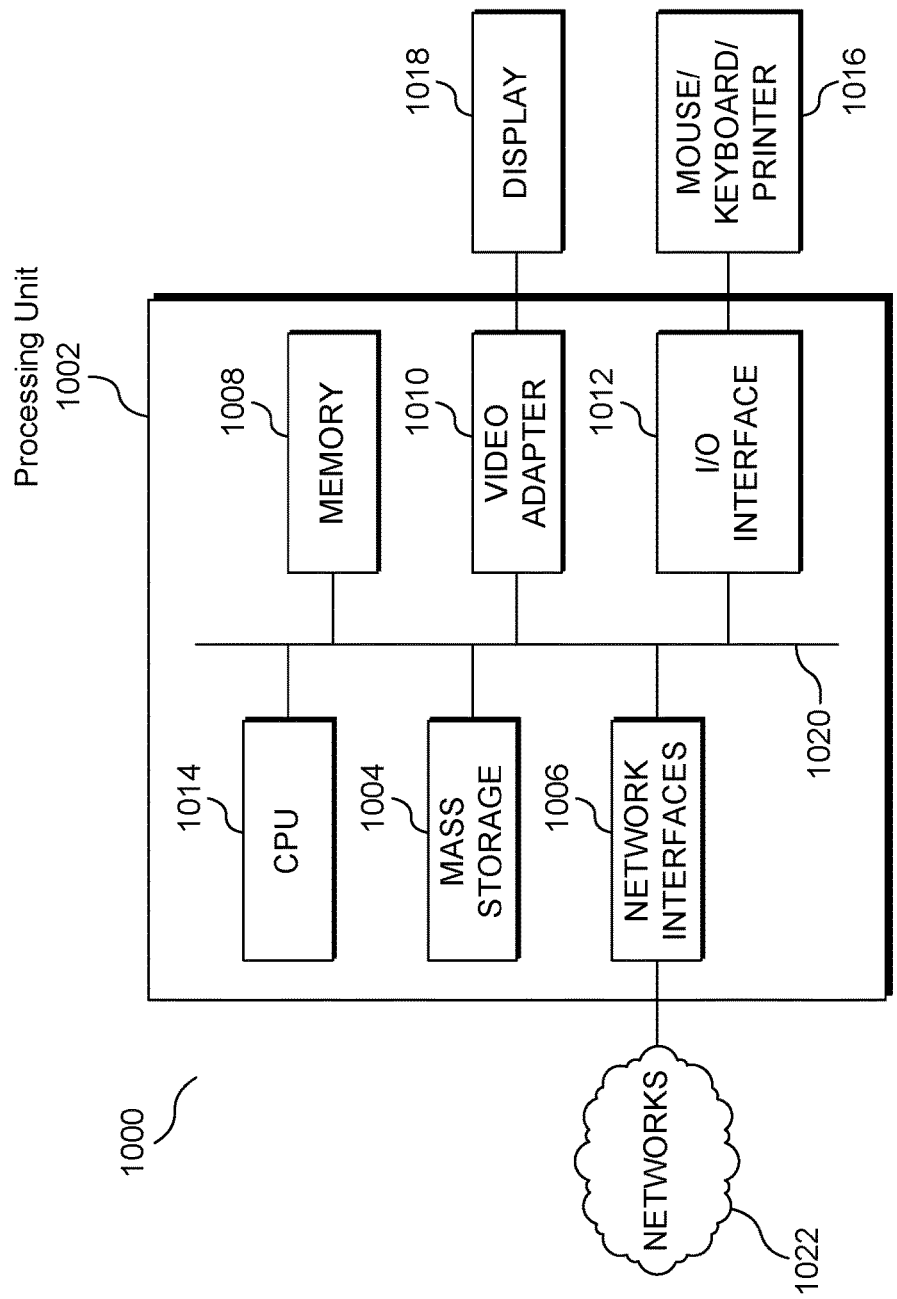
FIG. 10 is a block diagram of a computing system that may be used for implementing the devices and methods disclosed herein.

FIG. 10 is a block diagram of a computing system 1000 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020.

The bus 1020 may be one or more of any type of several bus architectures including a memory bus or memory controller, a peripheral bus, or a video bus. The CPU 1014 may comprise any type of electronic data processor. The memory 1008 may comprise any type of non-transitory system memory such as static random access memory (SRAM), dynamic random access memory (DRAM), synchronous DRAM (SDRAM), read-only memory (ROM), or a combination thereof. The memory 1008 may include ROM for use at boot-up, and DRAM for program and data storage for use while executing programs.

The mass storage 1004 may comprise any type of non-transitory storage device configured to store data, programs, and other information and to make the data, programs, and other information accessible via the bus 1020. The mass storage 1004 may comprise, for example, one or more of a solid state drive, hard disk drive, a magnetic disk drive, or an optical disk drive.

The video adapter 1010 and the I/O interface 1012 provide interfaces to couple external input and output devices to the processing unit 1002. As illustrated, examples of input and output devices include a display 1018 coupled to the video adapter 1010 and a mouse/keyboard/printer 1016 coupled to the I/O interface 1012. Other devices may be coupled to the processing unit 1002, and additional or fewer interface cards may be utilized. For example, a serial interface such as universal serial bus (USB) (not shown) may be used to provide an interface for an external device.

The processing unit 1002 also includes one or more network interfaces 1006, which may comprise wired links, such as an Ethernet cable, and/or wireless links to access nodes or different networks. The network interfaces 1006 allow the processing unit 1002 to communicate with remote units via the networks. For example, the network interfaces 1006 may provide wireless communication via one or more transmitters/transmit antennas and one or more receivers/receive antennas. The processing unit 1002 may be coupled to a local-area network 1022 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method of decoding an uplink signal in a network node of a wireless system, the method comprising:
   sending, by the network node, a wireless downlink signal to at least one network transmit point for transmission over a wireless link;
   receiving, by the network node, an encoded wireless uplink signal from a network receive point;
   determining, by the network node, a channel estimation between the at least one network transmit point and the network receive point;
   applying, by the network node, said corresponding channel estimate to a representation of the downlink signal sent by the at least one network transmit point, the application resulting in an estimate of a network transmit point interference signal received by the network receive point from that network transmit point;
   combining the network transmit point interference signals of the at least one network transmit point to produce an estimated network receive point interference signal; and
   decoding, by the network node, the encoded wireless uplink signal using the estimated network receive point interference signal.

2. The method as claimed in claim 1, wherein said decoding comprises:
   subtracting, by the network node, the estimated interference signal from the encoded uplink signal to form a resulting signal; and
   passing, by the network node, the resulting signal through a non-linear operator to produce a decoded uplink signal.

3. The method as claimed in claim 1, wherein the estimated network receive point interference signal is transmitted by the network node to the network receive point.

4. The method as claimed in claim 3, further comprising receiving, by the network node, a representation of the downlink signal sent by the at least one network transmit point at the time that the wireless uplink signal was received by the network receive point.

5. The method as claimed in claim 3, further comprising receiving, by the network node, the estimated interference signal for use in decoding the encoded wireless uplink signal.

6. A method of decoding a wireless uplink signal, the method comprising:
   sending, by a network node, a wireless downlink signal to at least one network transmit point for transmission over a wireless link;
   receiving, by the network node, an encoded uplink signal from a network receive point; and
   decoding, by the network node, the encoded uplink signal using an estimated interference signal, wherein the estimated interference signal comprises the downlink signal;
   the method further comprising the network node transmitting to the network receive point encoding instructions specifying parameters associated with an encoding operation to be performed at the network receive point to encode the wireless uplink signal, said encoding instructions including at least one of:
   a sampling rate to sample the wireless uplink signal;
   a number of bits to use in a bit reduction operation when encoding the wireless uplink signal;
   a specified encoding operation to use when encoding the wireless uplink signal; and
   at least one encoding parameter for use in the encoding operation.

7. A network node comprising:
   a transmitter, configured to send a wireless downlink signal to at least one network transmit point for transmission over a wireless link;

a receiver, configured to receive an encoded uplink signal from a network receive point; and a decoder, configured to decode the encoded wireless uplink signal using an estimated interference signal, wherein the estimated interference signal is generated, by the network node further comprising a controller, configured to:

perform a channel estimation for each of the at least one network transmit point to determine a corresponding channel estimate between that network transmit point and the network receive point;

determine said estimated interference signal by, for each network transmit point, applying said corresponding channel estimate to a representation of the downlink signal sent by that network transmit point, the application resulting in an estimate of a network transmit point interference signal received by the network receive point from that network transmit point; and combine the network transmit point interference signals to produce the estimated interference signal.

8. The network node as claimed in claim 7, wherein, to decode the encoded wireless uplink signal, the decoder is further configured to:

subtract the estimated interference signal from the encoded uplink signal to form a resulting signal; and pass the resulting signal through a non-linear operator to produce a decoded uplink signal.

9. The network node as claimed in claim 7, wherein the estimated interference signal is based on a combination of wireless downlink signals transmitted from at least one network transmit point within operational range of the network receive point.

10. The network node as claimed in claim 9, further comprising the controller configured to receive a representation of downlink signals sent by the at least one network transmit point at the time that the wireless uplink signal was received by the network receive point.

11. The network node as claimed in claim 9, further comprising the controller configured to receive a representation of the estimated interference signal for use in decoding the encoded wireless uplink signal.

12. The network node as claimed in claim 9, further comprising the controller configured to transmit to the network receive point encoding instructions specifying parameters associated with an encoding operation to be performed at the network receive point to encode the wireless uplink signal, said encoding instructions including at least one of:

a sampling rate to sample the wireless uplink signal;

a number of bits to use in a bit reduction operation when encoding the wireless uplink signal;

a specified encoding operation to use when encoding the wireless uplink signal; and at least one encoding parameters for use in the encoding operation.

13. A method of encoding a wireless uplink signal in a network receive point of a wireless system, the method comprising:

receiving, by the network receive point, encoding instructions from a network node to encode the wireless uplink signal, said encoding instructions including at least one of:

a sampling rate to sample the wireless uplink signal;

a number of bits to use in a bit reduction operation when encoding the wireless uplink signal;

a specified encoding operation to use when encoding the wireless uplink signal;

at least one encoding parameter for use in the encoding operation; and an estimated network receive point interference signal;

encoding, by the network receive point, the wireless uplink signal according to the encoding instructions; and transmitting, by the network receive point, the encoded wireless uplink signal to the network node.

14. The method as claimed in claim 13, wherein:

the network receive point is within operational range of at least one network transmit point; and the wireless uplink signal includes interference signals from the at least one network transmit point.

15. The method as claimed in claim 14, wherein the encoding is dependent upon the interference signals from the at least one network transmit point.

16. The method as claimed in claim 13, wherein the encoded uplink signal has a lower bandwidth than the wireless uplink signal.

17. A network receive point comprising:

receiving functionality configured to receive, encoding instructions from a network node to encode a wireless uplink signal, said encoding instructions including at least one of:

a sampling rate to sample the wireless uplink signal;

a number of bits to use in a bit reduction operation when encoding the wireless uplink signal;

a specified encoding operation to use when encoding the wireless uplink signal;

at least one encoding parameter for use in the encoding operation; and an estimated network receive point interference signal;

an encoder configured to encode the wireless uplink signal according to the encoding instructions; and transmitting functionality configured to send the encoded wireless uplink signal to the network node.

18. The network receive point as claimed in claim 17, further comprising:

at least one antenna configured to receive wireless uplink signals from user equipment; and at least one antenna configured to transmit wireless signals to user equipment.

* * * * *